(12) United States Patent
Pina

(10) Patent No.: US 10,970,779 B2
(45) Date of Patent: Apr. 6, 2021

(54) SYSTEM FOR FACILITATING MOBILE HOME PURCHASE TRANSACTIONS

(71) Applicant: Braustin Homes, Inc., San Antonio, TX (US)

(72) Inventor: Alberto Brandon Pina, San Antonio, TX (US)

(73) Assignee: Braustin Homes, Inc., San Antonio, TX (US)

( * ) Notice: Subject to any disclaimer, the term of this patent is extended or adjusted under 35 U.S.C. 154(b) by 0 days.

(21) Appl. No.: 16/126,596

(22) Filed: Sep. 10, 2018

(65) Prior Publication Data

US 2019/0080396 A1 Mar. 14, 2019

Related U.S. Application Data

(60) Provisional application No. 62/556,464, filed on Sep. 10, 2017.

(51) Int. Cl.
*G06Q 40/02* (2012.01)
*G06K 9/00* (2006.01)
*G06T 7/13* (2017.01)
*G06T 5/00* (2006.01)
*G06F 40/174* (2020.01)
*G06F 40/232* (2020.01)

(52) U.S. Cl.
CPC ........... *G06Q 40/02* (2013.01); *G06F 40/174* (2020.01); *G06F 40/232* (2020.01); *G06K 9/00442* (2013.01); *G06K 9/00463* (2013.01); *G06T 5/002* (2013.01); *G06T 7/13* (2017.01); *G06K 2209/01* (2013.01)

(58) Field of Classification Search
None
See application file for complete search history.

(56) References Cited

U.S. PATENT DOCUMENTS

| | | | |
|---|---|---|---|
| 7,003,489 B1* | 2/2006 | Dixon, III | G06Q 40/00 382/173 |
| 7,653,592 B1* | 1/2010 | Flaxman | G06Q 40/00 705/38 |
| 7,911,643 B2* | 3/2011 | Yamada | H04N 1/3333 358/1.9 |
| 8,156,018 B1* | 4/2012 | Quinn | G06Q 50/18 705/31 |
| 8,195,540 B2* | 6/2012 | Henry | G06Q 40/12 705/34 |
| 9,141,607 B1* | 9/2015 | Lee | G06F 17/289 |
| 9,147,232 B1* | 9/2015 | Kuo | G06T 5/30 |

(Continued)

*Primary Examiner* — Christopher Bridges
(74) *Attorney, Agent, or Firm* — Shah IP Law, PLLC

(57) ABSTRACT

Systems and methods for permitting a buyer of a mobile home to apply for a mortgage by taking digital photographs of documents with his or her mobile device are disclosed. The borrower's mobile device may include subsystems for processing the image, optimizing it, and converting the image into a file type that may be acceptable by a lender. A loan facilitation platform performs additional processing to determine whether the document may be deemed acceptable by a lender. If so, the processed documents may be sent to a lender. The systems and method disclosed herein improve the mortgage application review and approval process and bring greater transparency to it.

5 Claims, 12 Drawing Sheets

(56) References Cited

U.S. PATENT DOCUMENTS

| | | | |
|---|---|---|---|
| 2012/0265655 A1* | 10/2012 | Stroh | G06Q 40/00 |
| | | | 705/30 |
| 2013/0022231 A1* | 1/2013 | Nepomniachtchi | G06K 9/3275 |
| | | | 382/102 |
| 2013/0297488 A1* | 11/2013 | Boyanov | G06Q 40/02 |
| | | | 705/38 |
| 2015/0106258 A1* | 4/2015 | Coomes | G06Q 40/025 |
| | | | 705/38 |
| 2015/0112853 A1* | 4/2015 | Hegarty | G06Q 40/025 |
| | | | 705/38 |
| 2017/0109830 A1* | 4/2017 | Macciola | H04N 1/387 |
| 2018/0253599 A1* | 9/2018 | Shepard | G06K 9/00469 |

* cited by examiner

SYSTEM FOR FACILITATING MOBILE HOME PURCHASE TRANSACTIONS

CROSS-REFERENCE TO RELATED APPLICATIONS

This application claims priority to U.S. Provisional Patent Application Ser. No. 62/556,464, filed Sep. 10, 2017, entitled "SYSTEM AND METHOD FOR EXECUTING COMPLEX TRANSACTIONS" the entire content of which is incorporated herein by reference.

BACKGROUND

Field of the Art

The present disclosure generally relates to a system or platform for purchasing a mobile home. More specifically, the present disclosure provides a system that facilitates mobile home purchase transactions by ensuring that documents that support a mortgage application to purchase the mobile home are submitted properly and in a timely manner to ensure that the deal does not fall through for having errors, omissions, or otherwise being untimely.

Discussion of the State of the Art

Buyers of mobile homes often finance their mobile home purchase with a mortgage that is payable over time. However, in order to use a mortgage to close a transaction to purchase the mobile home, buyers often have to go through a tedious, lengthy, and complicated mortgage approval process, which requires buyers to send a slew of documents to a lender for approval. This process often gets derailed because buyers do not know which documents should be submitted to the lender, or whether the documents have reached the lender in a timely manner. Moreover, buyers often do not know—or find out when it is too late—whether a lender has accepted or rejected their submitted documents for substantive or technical reasons. Thus, because buyers often do not have sufficient time to cure substantive or technical errors and omissions, their mortgage application may be denied.

This problem is exacerbated when documents are digitally captured and sent or received over digital data networks. Generally, borrowers tend to photograph physical documents on their mobile devices and digitally send the photographs to lenders for approval and mortgage processing. This practice often derails the mortgage approval process because photographs taken on a mobile device are often unacceptable to lenders for practical, technical, and legal reasons. Digital photographs of documents, for example, are often illegible or not legible enough for the mortgage approval process. Moreover, digital photographs often distort the underlying documents making them unacceptable from a verification perspective. In certain states and countries, physical signatures that are digitally photographed, or documents that are digitally signed may not be acceptable. In these circumstances, digital submission from a borrower's mobile phone or a mobile photography device may further slowdown the mortgage approval process and may result in application rejections for submission of unacceptable documents. Moreover, lenders do not have any specific system for identifying the deficiencies associated with digitally captured and digitally shared documents. For example, lenders often only check to see that documents are submitted. The documents themselves are not analyzed further until later. Often, by the time the documents are analyzed and deemed insufficient or inappropriate, there is insufficient time to cure deficiencies that are identified, and, as a result, these types of applications fail to close on time or may never be accepted because of the deficiencies.

SUMMARY

The present disclosure solves this problem by introducing a digital image processing system for ensuring that the photographs taken by the borrower will be acceptable to the lender, and by introducing a verification system for reviewing and analyzing digitally captured and digitally submitted documents before they are submitted to a lender.

This approach is an unconventional solution to the problem of allowing borrowers to digitally capture and digitally submit documents to the lenders, while also ensuring that digitally captured and digitally submitted documents pass the mortgage approval process in a timely manner. The disclosure and the corresponding claims do not claim the mortgage submission process in the abstract. Rather, the disclosure and corresponding claims are narrowly drafted to solve problems that are necessarily rooted in software (i.e. submitting documents that are captured with a digital camera on a mobile device for the mortgage approval process in a manner that minimizes the likelihood that the document will be rejected by a lender). Moreover, the present disclosure and the corresponding claims do not attempt to patent every method for closing mortgages with digital submissions. Rather, the disclosure and the corresponding claims are narrowly tailored to identify specific types of documents, apply a specific type of processing to digital images, enable review and approval at a specific location in the document submission workflow, and enable specific systems and processes to guide the borrower through the mortgage approval process.

The approach of the present disclosure is also an unconventional implementation. The conventional method for reviewing documents happens at the lender. However, as discussed above, this approach is inefficient and often ineffective at identifying deficiencies in submitted documents. In addition, this approach brings opaqueness to the application and submission process as borrowers often do not know, or do not find out until it is too late, whether their documents were received by a lender, reviewed by the lender, approved or denied by the lender. As a result lenders and borrowers are unable to cure the error in time. The present disclosure and the corresponding claims narrowly claim an unconventional implementation for reviewing and analyzing documents for sufficiency at a specific location, which enables errors to be discovered before documents are submitted to the lender and brings great transparency to the application process, as described in greater below. Indeed, this is an unconventional and a counter intuitive implementation because adding another layer of review would normally be considered a step in the wrong direction, and would generally be expected to cause additional delays.

One goal of the present disclosure is to provide an improved system and platform that facilitates mortgage application process for purchasing mobile homes by making sure that the borrower does not submit documents that are deficient or otherwise ineligible for consideration or use by a lender. The disclosed system achieves its goal by enabling a loan facilitation system and/or a loan facilitation officer to interject and review documents before they are sent to a lender. If the documents pass certain quality checks, then they are submitted to lenders. The system also permits all stakeholders to have real-time access to the status of various documents. This allows the stakeholders to act quickly and cure any deficiencies that may derail the approval process in a timely manner. Indeed, the disclosed system is not related to a series of real estate transactions, rather, it is a system that safeguards buyers from submitting deficient documents by using a specific system. Accordingly, the disclosed system is directed to interactions between a borrower's mobile device, a loan facilitation system and/or a loan facilitation officer's computing device, and a lender's computing systems, and a method for enabling different interactions between various component devices.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

Figure 4A:
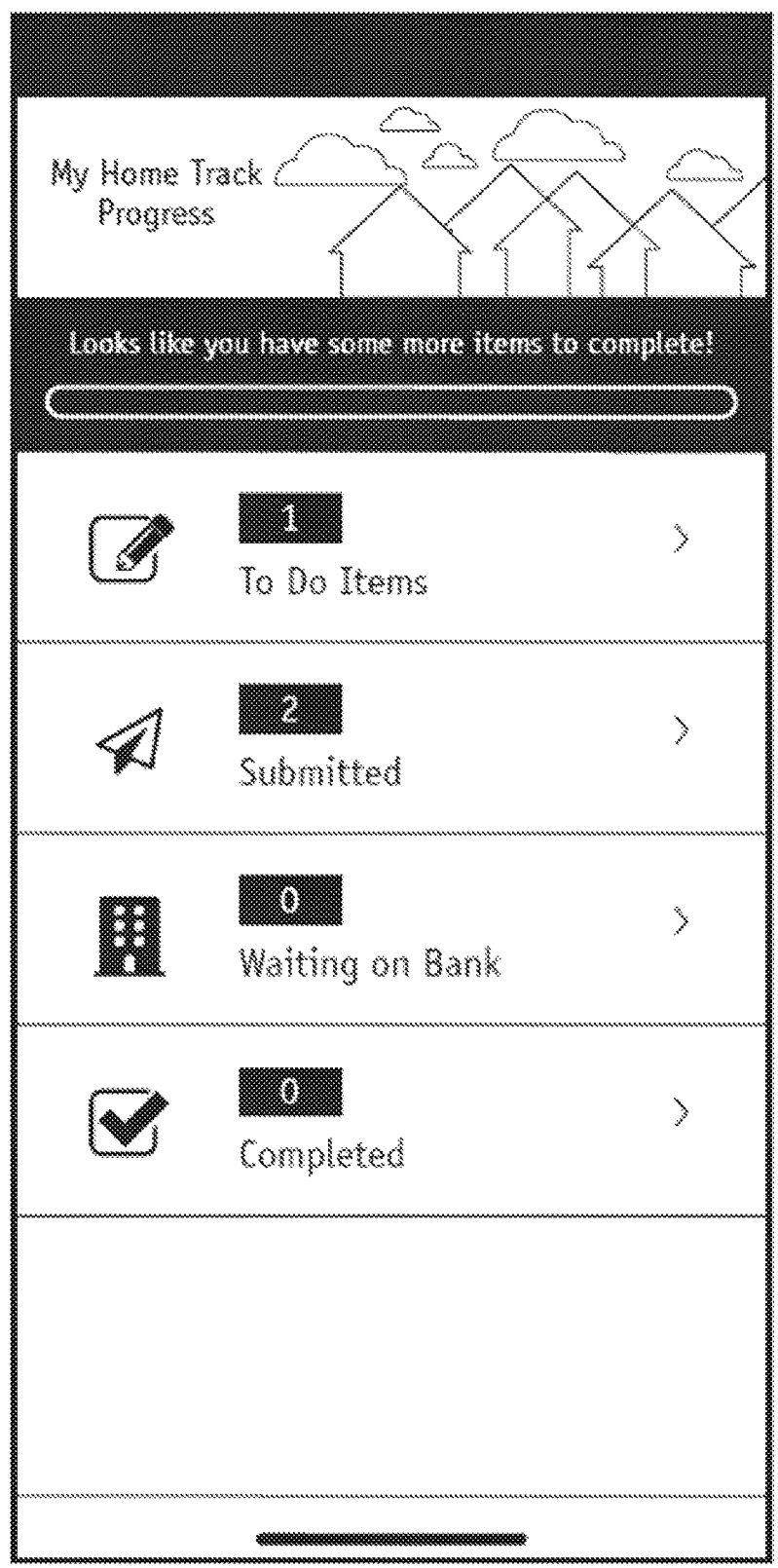

FIG. 4*a* illustrates user interface elements that may be presented to a borrower on an application running on the mobile device, in accordance with one exemplary embodiment of the invention.

Figure 4B:
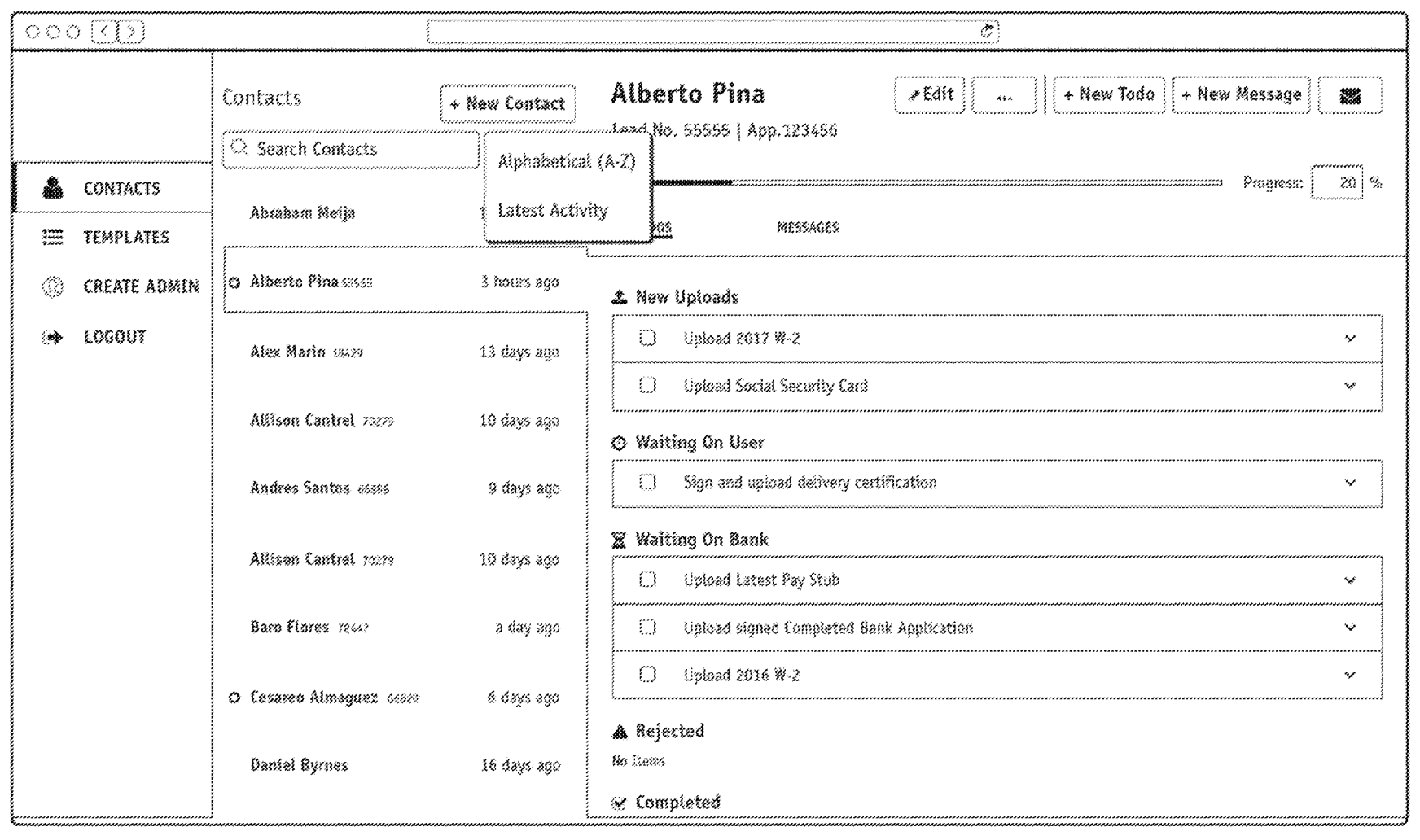

FIG. 4*b* illustrates user interface elements that may be presented to a loan facilitation officer on his or her computing device, in accordance with one exemplary embodiment of the invention.

Figure 4C:
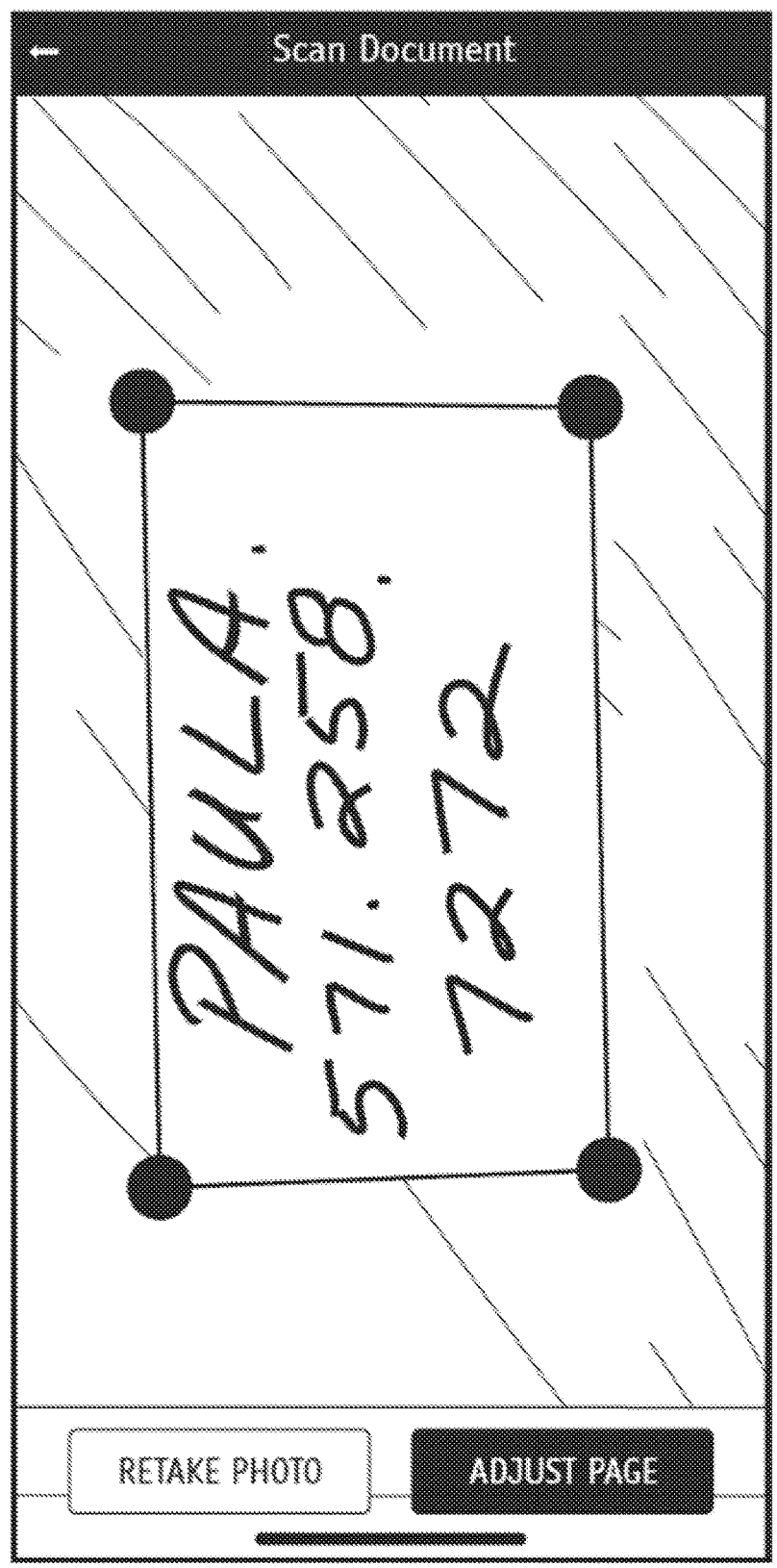

FIG. 4*c* illustrates user interface elements that may be presented to a borrower on an application running on the mobile device, in accordance with one exemplary embodiment of the invention.

FIG. 4*d* illustrates user interface elements that may be presented to a loan facilitation officer on his or her computing device, in accordance with one exemplary embodiment of the invention.

Figure 4E:
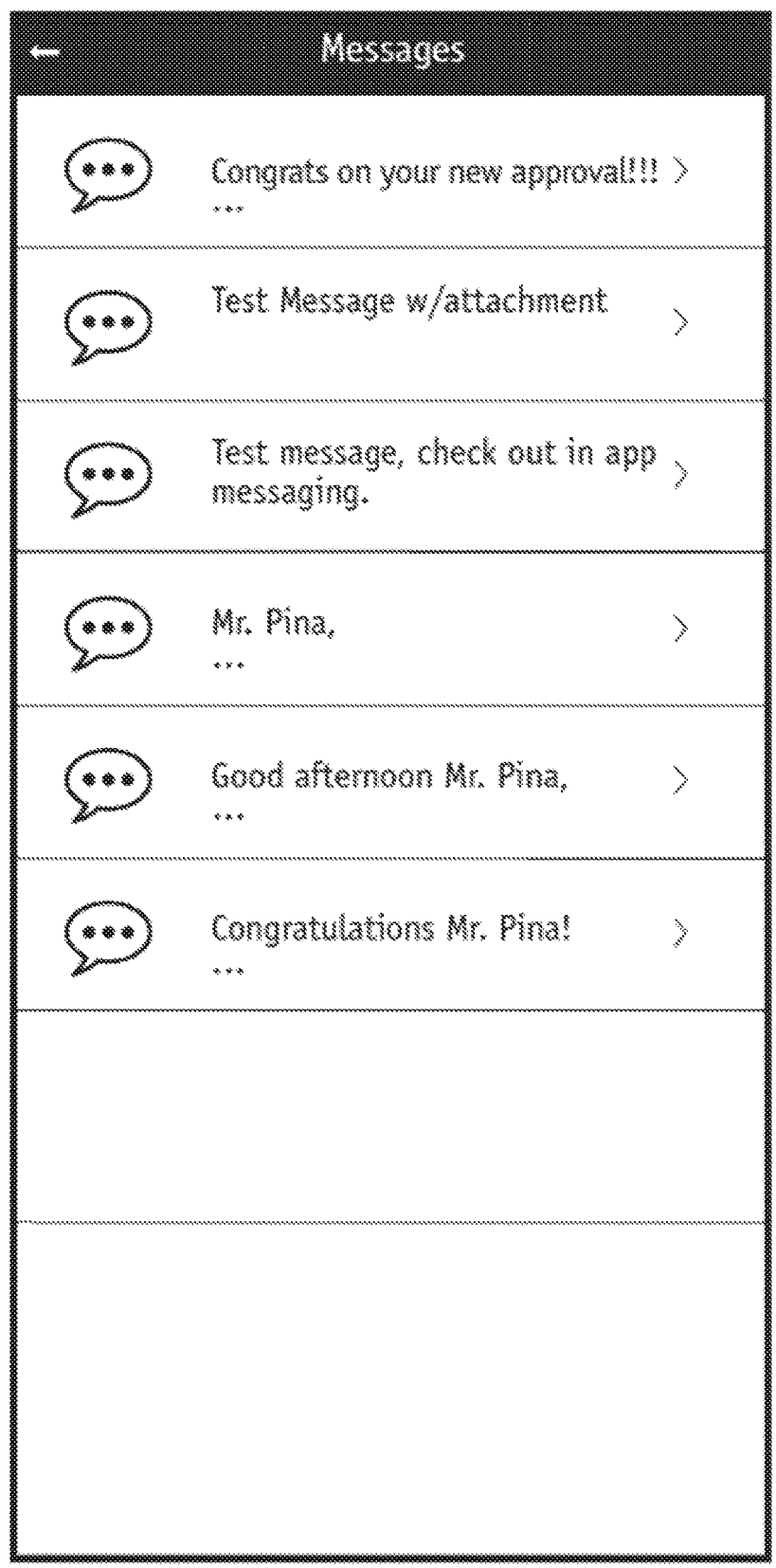

FIG. 4*e* illustrates user interface elements that may be presented to a borrower on an application running on the mobile device, in accordance with one exemplary embodiment of the invention.

Figure 4F:
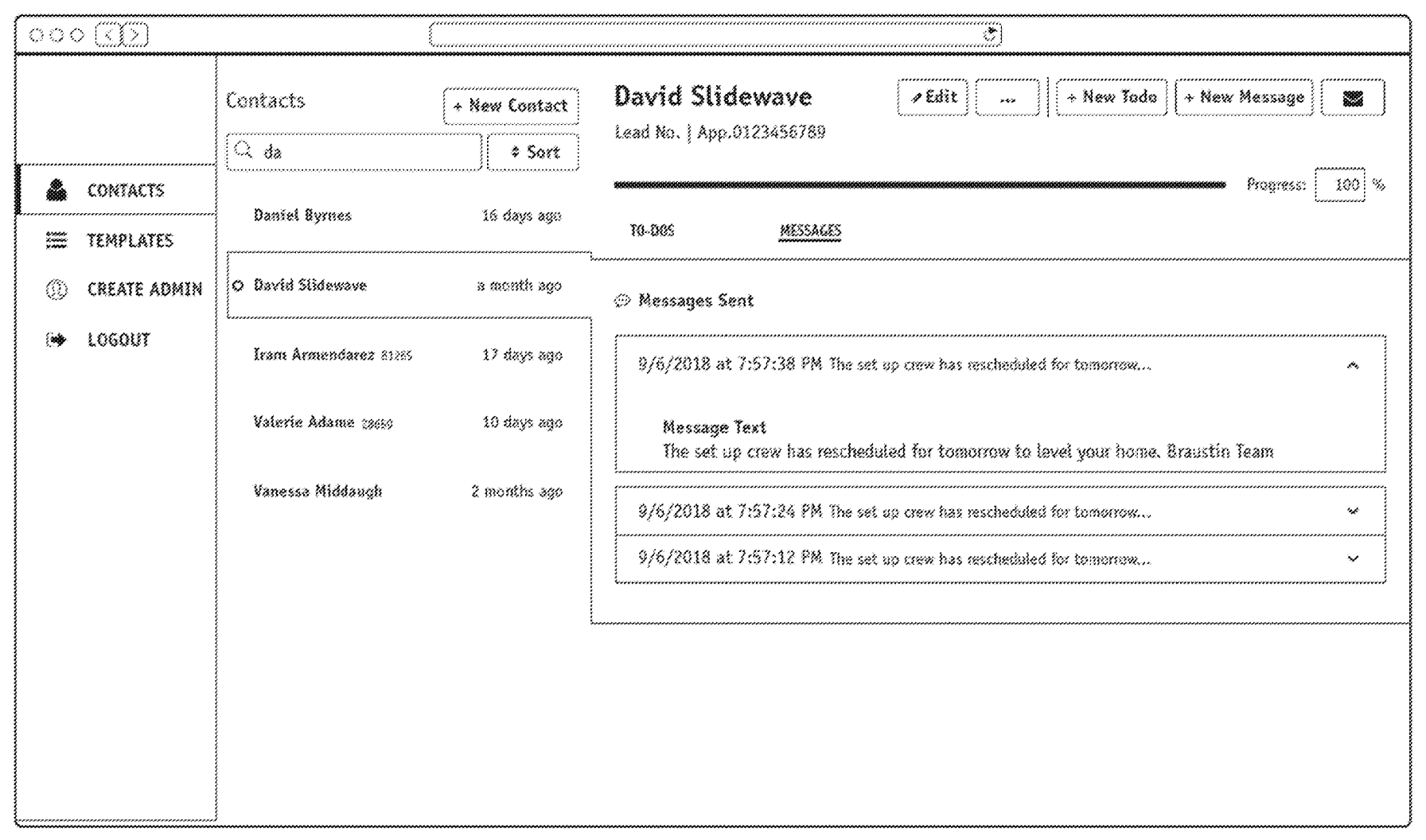

FIG. 4*f* illustrates user interface elements that may be presented to a loan facilitation officer on his or her computing device, in accordance with one exemplary embodiment of the invention.

Figure 5:
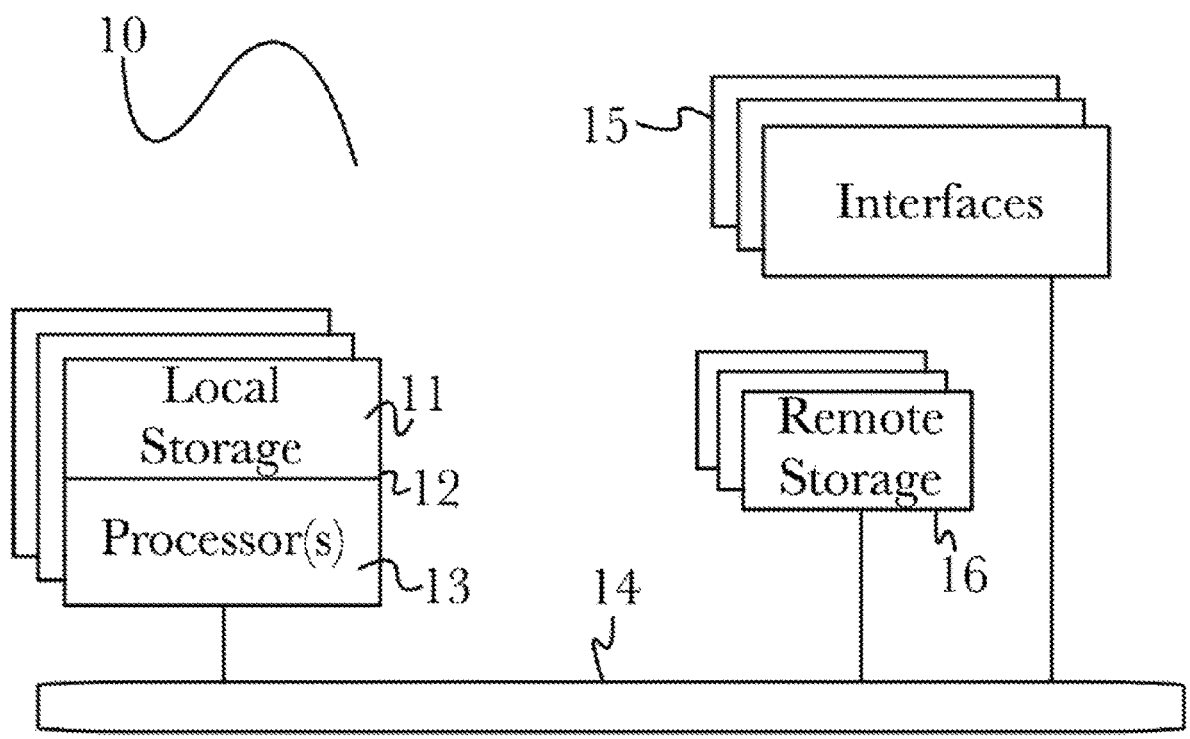

FIG. 5 is a block diagram illustrating an exemplary hardware architecture of a computing device, according to a preferred embodiment of the invention.

Figure 6:
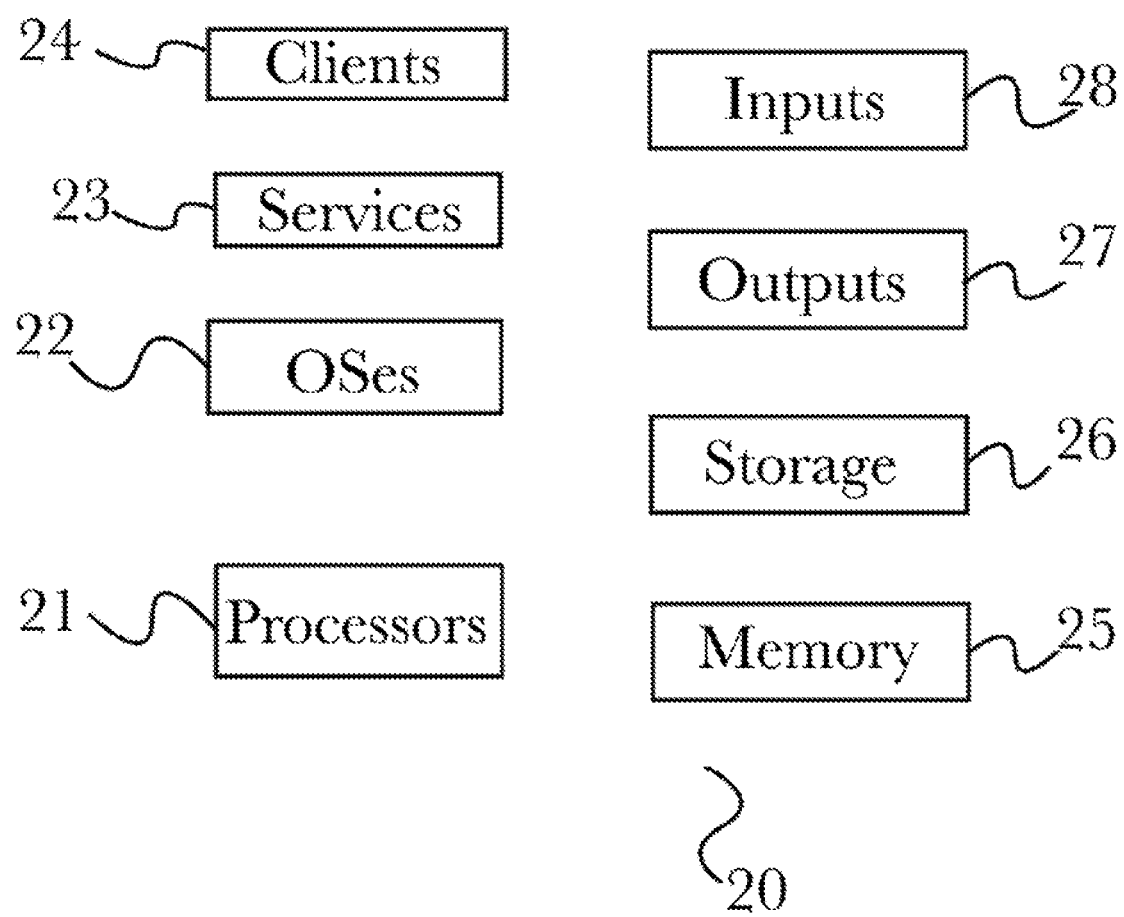

FIG. 6 is a block diagram illustrating an exemplary logical architecture for a client device, according to a preferred embodiment of the invention.

Figure 7:
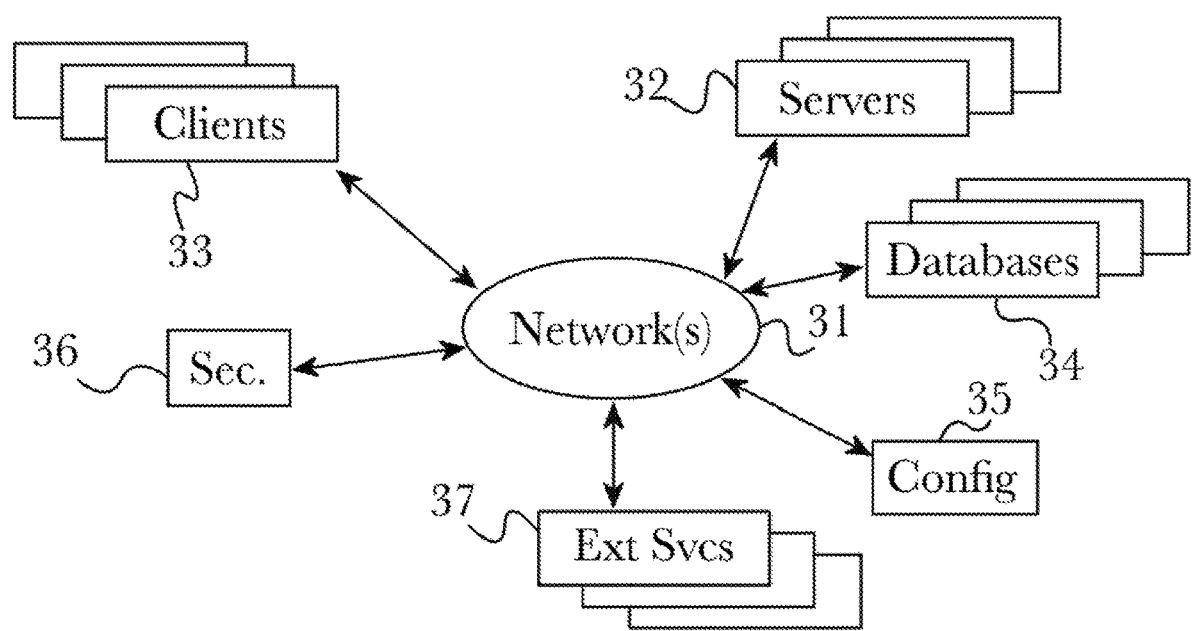

FIG. 7 is a block diagram showing an exemplary architectural arrangement of clients, servers, and external services, according to a preferred embodiment of the invention.

Figure 8:
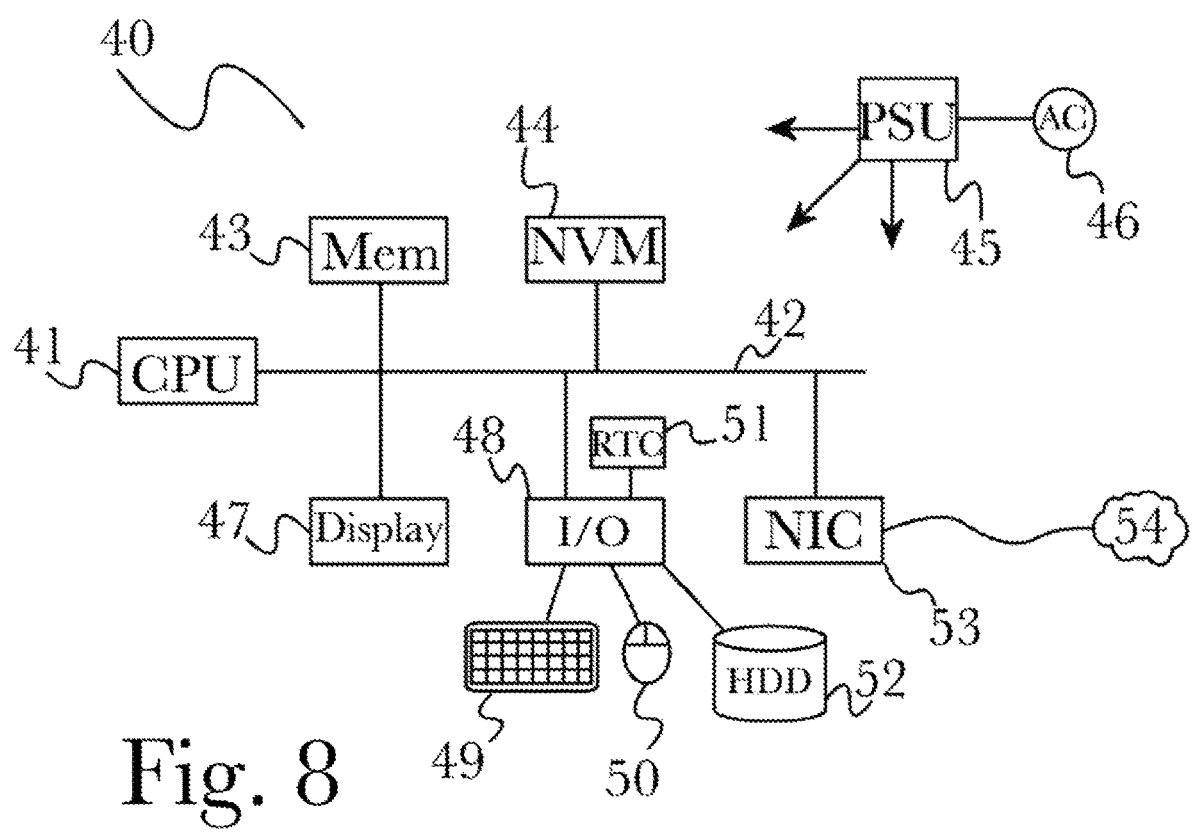

FIG. 8 is another block diagram illustrating an exemplary hardware architecture of a computing device, according to a preferred embodiment of the invention.

DETAILED DESCRIPTION

The inventor has conceived, and reduced to practice, systems and methods for permitting a buyer of a mobile home to apply for a mortgage by taking digital photographs of documents with his or her mobile device, reviewing and verifying the documents, and submitting the documents to a lender. The inventive systems and methods reduces the delay and failure rate that is often associated with submitting mortgage documents in this manner. The systems and/or methods described herein may comprise a computing device comprising a non-transitory non-volatile computer-readable storage device including instructions, which, when executed by a processor of the computing device, cause the computing device to: identify a list of documents that the borrower must submit to a lender to complete a mortgage application for purchasing a mobile home; send the list of documents to the borrower's mobile device for display on an application running on the borrower's mobile device; send a status update for display on the application running on the borrower's mobile device, the status update indicating documents that a borrower must submit to the lender to complete a loan application to purchase a mobile home, documents that have been submitted by the borrower and are being reviewed by a loan facilitator, documents that have been submitted to the lender by the loan facilitator, and documents that have been approved by the lender; receive at least one document from the borrower's mobile device, the document relating to at least one document in the list of documents that must be submitted to the lender, the document being created by processing an image file capturing a representation of a document that the borrower must submit to the lender, and the document being created by converting the image file into a file format that is acceptable to the lender; review the received one or more documents, wherein the review comprising an approval or a request to resubmit the document; send the document to the lender if it is approved by the loan facilitation system; receive a review from the lender regarding each document sent to the lender, the update comprising an approval or a denial; update the borrower's mobile device and the loan facilitator's computing device instantly and simultaneously when a document has been requested from the borrower, submitted by the borrower, received a review from the loan facilitator, or received a review from the lender; establish a direct communication connection between the borrower's mobile device with the loan facilitator's computing device, the direct communication connection enabling the borrower to communicate with a loan facilitator via the application on the borrower's mobile device.

The computing device may also include additional instructions for identifying a list of documents that the borrower must submit to the lender cause the computing device to: send at least one question to the borrower's mobile device, the question relating to the borrower's biographic information; receive at least one answer to the at least one question from an application running on the borrower's mobile device; and identify a list of documents based the borrower's answer that the borrower must submit to a lender to complete a mortgage application for purchasing a mobile home.

The systems and/or methods described herein may comprise a mobile computing device comprising a non-transitory non-volatile computer-readable storage device including instructions, which when executed by a processor of the mobile computing device, cause the mobile computing device to: receive information from a loan facilitation system, the information related to applying for a loan to purchase a mobile home, wherein the information indicating items that a borrower must submit to a lender to complete a loan application to purchase a mobile home, items that have been submitted to the lender, items that the lender must provide to complete the loan application, and items that have been completed by at least one of the borrower and the lender; display the received information on the mobile computing device; capture an image of at least one document, each document corresponding to at least one request for information related to applying for a loan; process the image to ensure legibility and improve the likelihood that the image will be accepted by a lender, the process comprising finding page corners within the image; convert the image to a file format that is acceptable to the lender; send the document to the loan facilitation system; receive an update on an application on the mobile computing device, the update indicating that that the borrower has successfully uploaded one or more documents; receive one or more additional updates on the mobile computing device and the loan facilitation system instantly and simultaneously when a document has been requested from the borrower, submitted by the borrower, received a review from the loan facilitator, or received a review from the lender; and establish a direct communication connection with the loan facilitation system, the direct communication connection enabling the borrower to communicate with a loan facilitator via the application while using the borrower's mobile device.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Figure 1:
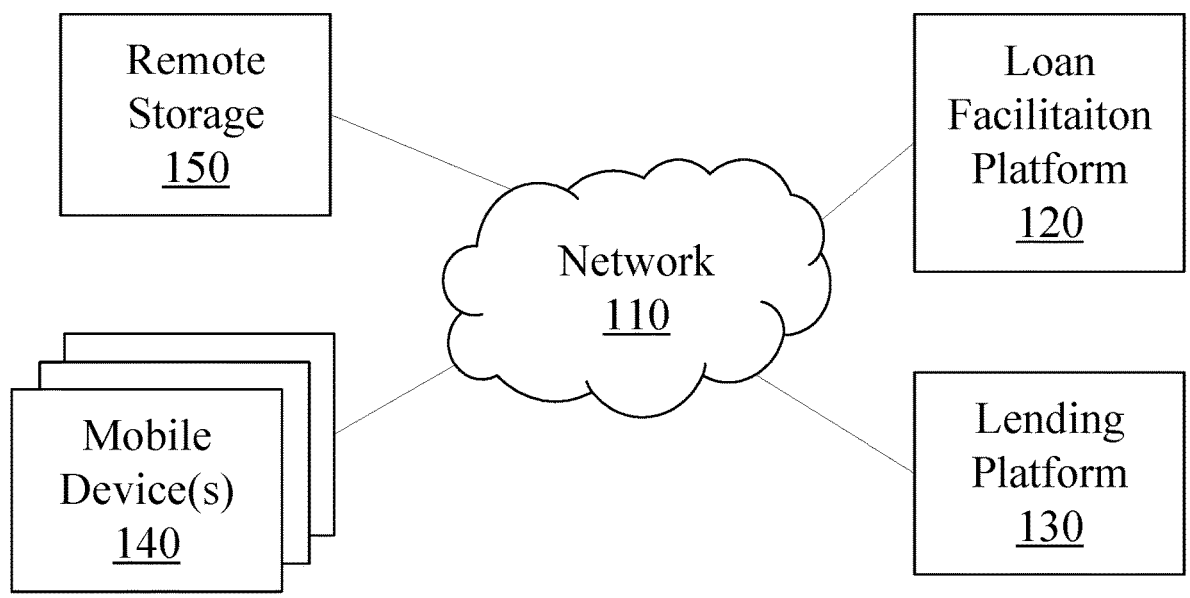
FIG. 1 is a block diagram illustrating an exemplary operating environment, according to an embodiment of the invention.

FIG. 1 illustrates connections among various computing agents, in accordance to one exemplary embodiment. The system comprises mobile computing device(s) 140, which may belong to a borrower, loan facilitation platform 120, lending platform 130, remote storage 150, and network 110. It is noted that multiple instances of the disclosed systems and sub-systems may be present in various embodiments, and that references herein to a system or a sub-system (e.g., mobile computing device(s) 140, loan facilitation platform 120, etc.) generally refers to one or more of the systems or sub-systems. In an alternative embodiment, the functionalities of multiple agents may be merged, modified, or split into a functionally equivalent set of systems and sub-systems. The various computing agents may comprise one or more computing devices, like the computing device 10 illustrated in FIG. 5 and/or the computer system 40 illustrated in FIG. 8.

Broadly, the various computing platforms and devices connect together to enable a borrower to digitally capture documents in an image file on a mobile device 140 for submission to the lending platform 130. The borrower's mobile device 140 may include subsystems for processing the image, optimizing it, and converting the image into a file type that may be acceptable by the lending platform 130. The loan facilitation platform 120 performs additional processing to determine whether the document may be deemed acceptable by a lender. If so, the processed documents may be sent to lending platform 130. The one or more documents used by these subsystems may be stored in, and retrieved from remote storage 150.

The network 150 connects the various systems and computing devices. The network 110 may comprise a wide area network (WAN). The network 110 may comprise a local area network (LAN). The network 110 may comprise a physical connection between two or more of the scoring system 102, the feedback device 104, and the digital data acquisition system 106. The network 110 may comprise a bus between two or more of the scoring system 102, the feedback device 104, and the digital data acquisition system 106. At least a portion of the network 110 may be private. At least a portion of the network 110 may be public, such as the Internet. The network 110 may be capable of transporting messages comprising one or more messaging protocol.

As described herein, the framework, as illustrated in FIG. 1, enables the system to track the status of the documents over the entire workflow, which enables all parties to detect errors in time and cure deficiencies in a timely manner, thereby reducing the likelihood that the mortgage application falls through, is delayed, or is rejected for technical or substantive reasons. The status information may be displayed on an application on the borrower's mobile device 140 and/or on the loan facilitation platform 120, wherein a loan facilitation officer may be able to view the graphical user interface related to the status update.

Figure 2:
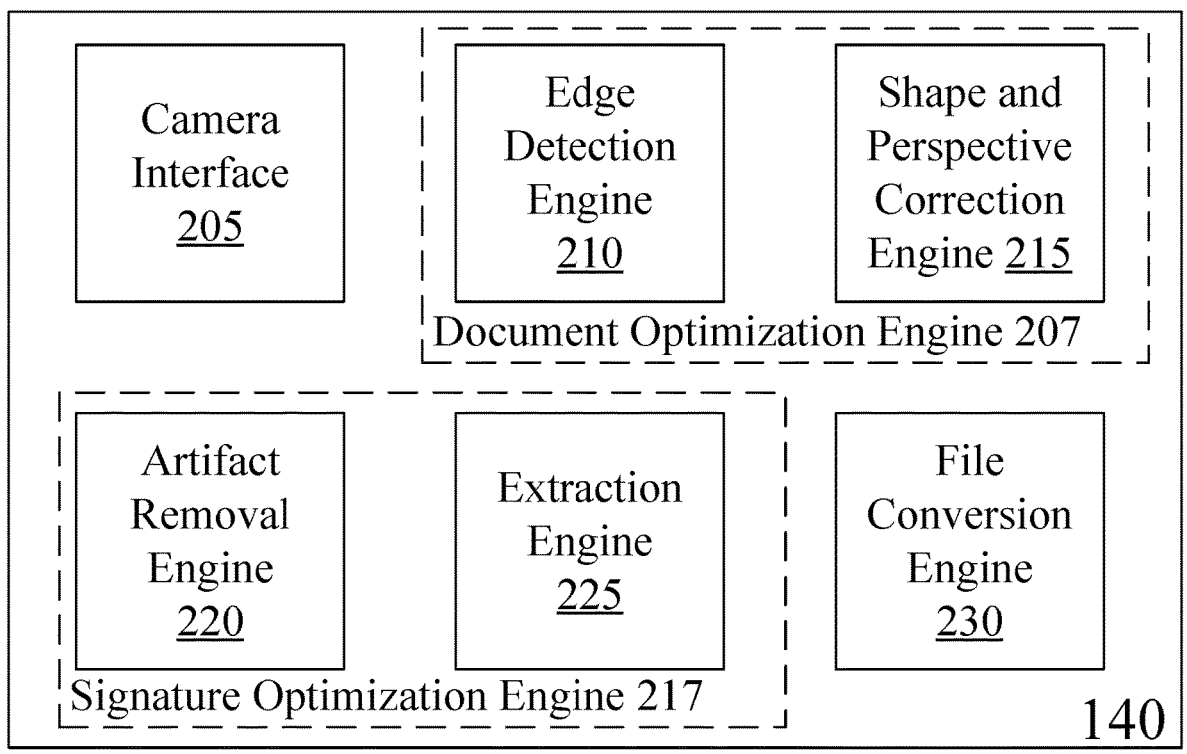
FIG. 2 is a block diagram illustrating a mobile device system, according to an exemplary embodiment of the invention.

Referring now to FIG. 2 illustrating exemplary modules executing on an exemplary mobile device 104. The modules include a camera interface 205, a document detection engine 207, which comprises an edge detection engine 210 and a shape and perspective correction engine 215, a signature optimization engine 217, which comprises an artifact removal engine 220 and an extraction engine 225. The mobile device 140 may also include a file conversion engine 230. The various modules optimize and convert an image file into another file format that may be acceptable to the lender.

The camera interface 205 interfaces with a digital camera or a digital image capture device that may be connected to associated with the mobile device 140 to capture an image of a document that may be requested by the lender. In one embodiment, the camera interface 205 may connect directly to a file system or directory wherein a mobile device 140 may locally or remotely store image files. The camera interface 205 may access the image files via those permissions. However, any number of ways of interfacing with an on-board or off board digital camera may be used, as would be readily apparent to a person of ordinary skill in the art, without departing from the scope of the invention. The camera interface 205 may comprise one or more computing devices, like the computing device 10 illustrated in FIG. 5 and/or the computer system 40 illustrated in FIG. 8.

The document optimization engine 207 may comprise an edge detection engine 210 and a shape perspective correction engine 215. The edge detection engine 210 may comprise a page corner finding procedure. An example page corner finding procedure may comprise one or more image processing procedures. The one or more image processing procedures may comprise a blur procedure, a dilate procedure, an edge detection procedure, a line detection procedure, a line creation procedure, a contour detection procedure, a contour arc filtering procedure, a contour area filtering procedure, a convex hull procedure, and a point determination procedure.

The blur procedure may be used to remove compression artifacts (e.g., lettering, etc.) and/or noise from an image. The blur procedure may blur an image using a filter. The filter may comprise a Gaussian filter. The filter may comprise a blur kernel. An example blur kernel may comprise a 7×7 matrix.

The dilate procedure may be used to reduce artifacts (e.g., lettering, etc.) from an image and/or to emphasize one or more page edges. The dilate procedure may dilate an image using a dilate kernel. An example dilate kernel may comprise an 8×8 matrix.

The edge detection procedure may be used to find edges. The edge detection procedure may comprise a Canny Edge Detection algorithm. The edge detection procedure may comprise a first threshold and a second threshold. A smallest value between the first threshold and the second threshold may be used to link edges. An example first threshold may comprise a value of or around 3. An example second threshold may comprise a value of or around 84.

The line detection procedure may be used to find straight lines based on edges detected (e.g., edges detected by the edge detection procedure, etc.). The line detection procedure may comprise a Hough Line Transform algorithm.

The line creation procedure may be used to draw lines based on found lines (e.g., lines found by the line detection procedure, etc.).

The contour detection procedure may be used to detect edges. The contour detection procedure may comprise a Teh-Chin chain approximation algorithm. The contour detection procedure may detect only extreme outer contours.

The contour arc filtering procedure may be used to limit which contours are considered. The contour arc filtering procedure may discard all contours comprising an arc below an arc length threshold. The arc length threshold may comprise a value of or around 1,500.

The contour area filtering procedure may be used to limit which contours are considered. The contour area filtering procedure may discard all contours comprising an area below a pixel threshold. The pixel threshold may comprise a value of or around 10,000 pixels.

The convex hull procedure may be used to form a shape, such as a rectangle, around contours (e.g., rectangles may be formed around contours remaining after the contour detection procedure, the contour arc filtering procedure, and/or the contour area filtering procedure, etc.). The convex hull procedure may wrap contours that were not connected by previous procedures.

The point determination procedure may be used to determine a number of points (e.g., corners, angles, etc.) in shapes (e.g., a number of points of the shapes formed by the convex hull procedure may be determined, etc.). If the number of points in a shape is determined to be anything other than four, then the shape may be discarded. If the point determination procedure determines that more than one shape has four points, then a biggest shape may be selected. The biggest shape may be determined to be a page.

The page corner finding procedure may comprise performing the image processing procedures in a series, such that the output of a first procedure comprises the input to a subsequent procedure. The series of image processing procedures may comprise the blur procedure at a first time (to remove compression artifacts and noise from an image), the dilate procedure at a second time (to further remove artifacts, such as lettering, from the image), the dilate procedure at a third time (to further remove artifacts, such as lettering, from the image), the blur procedure at a fourth time (to further remove compression artifacts and noise from an image), the edge detection procedure at a fifth time (to find edges), the dilate procedure at a sixth time (to better outline page edges), the dilate procedure at a seventh time (to better outline page edges), the line detection procedure at an eighth time (to find straight lines based on the found edges), the line creation procedure at a ninth time (to draw the found lines on the image (e.g., to make the lines easier to detect, etc.)), the contour detection procedure at a tenth time (to detect contours within the draw lines), the contour arc filtering procedure at an eleventh time (to filter out contours that are not an outline of a page), the contour area filtering procedure at a twelfth time (to filter out contours that are not an outline of a page), the convex hull procedure at a thirteenth time (to wrap remaining contours), and the point determination procedure at a fourteenth time (to determine a number of points (e.g., angles, corners, etc.)).

The shape perspective correction engine 215 may comprise a corrective procedure. After the page is determined, an image on which the page was determined may undergo the corrective procedure. The corrective procedure may comprise a perspective correction procedure (e.g., perspective warping procedure, perspective changing procedure, etc.) and a contrast enhancement procedure. The perspective correction procedure may cause corners of the page in the image to comprise an angle of or around 90 degrees. The perspective correction procedure may cause two vertical edges of the of the page in the image to be parallel or near parallel. The perspective correction procedure may cause two horizontal edges of the of the page in the image to be parallel or near parallel.

The contrast enhancement procedure may comprise a contrast limited adaptive histogram equalization procedure. The contrast limited adaptive histogram equalization procedure may comprise an contrast limiting threshold. The contrast limiting threshold may comprise a value of or around 4.0. The contrast limited adaptive histogram equalization procedure may comprise a grid for histogram equalization. The grid for histogram equalization may comprise an 8×8 matrix. The contrast enhancement procedure may enhance contrast and/or readability of information in the page in the image. The contrast enhancement procedure may comprise producing an image with a contrast/brightness correction alpha of or near 1.5 and/or a beta of or around 5.0.

Although described as performed by the document optimization engine 207, the page corner finding procedure and/or the corrective procedure may be performed elsewhere. For example, the page corner finding procedure and/or the corrective procedure may be performed by the loan facilitation platform 120 and/or the lending platform 130.

The signature optimization engine 217 identified and extract signatures from one or more image files. In some states, borrowers are not permitted to digitally sign documents. If they digitally sign the any loan document, for example, via a application such DocuSign®, that document may be rejected and may serve as a sufficient basis for rejecting the borrower's application. In those circumstances, and it other situations, the signature optimization engine 217 identifies and extracts signature to place upon other documents that may or must be signed by the borrower. In one embodiment, the signature optimization engine 217 may comprise an artifact removal engine 220 and an extraction engine 225. The artifact removal engine 220 may comprise a blur procedure. The blur procedure may be used to remove compression artifacts (e.g., lettering, etc.) and/or noise from an image. The blur procedure may blur an image using a filter. The filter may comprise a Gaussian filter. The filter may comprise a blur kernel. An example blur kernel may comprise a 7×7 matrix.

The extraction engine 225 may comprise a contour detection procedure, a contour arc filtering procedure, a contour area filtering procedure, a convex hull procedure, a contour selection procedure, and an enhancement procedure.

The contour detection procedure may be used to detect edges. The contour detection procedure may comprise a Teh-Chin chain approximation algorithm. The contour detection procedure may detect only extreme outer contours.

The contour arc filtering procedure may be used to limit which contours are considered. The contour arc filtering procedure may discard all contours comprising an arc below an arc length threshold. The arc length threshold may comprise a value of or around 1,500.

The contour area filtering procedure may be used to limit which contours are considered. The contour area filtering procedure may discard all contours comprising an area below a pixel threshold. The pixel threshold may comprise a value of or around 10,000 pixels.

The convex hull procedure may be used to form a shape, such as a rectangle, around contours (e.g., rectangles may be formed around contours remaining after the contour detection procedure, the contour arc filtering procedure, and/or the contour area filtering procedure, etc.). The convex hull procedure may wrap contours that were not connected by previous procedures.

The contour selection procedure may comprise selecting a wrapped contour likely to comprise a signature. Selecting a wrapped contour likely to comprise a signature may comprise selecting a largest of the wrapped contours. Everything other than the selected wrapped contour may be eliminated from the image.

The enhancement procedure may comprise converting the image into a black and white image. The enhancement procedure may comprise a contrast enhancement procedure. The contrast enhancement procedure may comprise a contrast limited adaptive histogram equalization procedure. The contrast limited adaptive histogram equalization procedure may comprise a contrast limiting threshold. The contrast limiting threshold may comprise a value of or around 4.0. The contrast limited adaptive histogram equalization procedure may comprise a grid for histogram equalization. The grid for histogram equalization may comprise an 8×8 matrix. The contrast enhancement procedure may enhance contrast and/or readability of information in the page in the image. The contrast enhancement procedure may comprise producing an image with a contrast/brightness correction alpha of or near 1.5 and/or a beta of or around 5.0.

Although described as performed by the signature optimization engine 217, the preceding procedures may be performed elsewhere. For example, the procedures may be performed by the loan facilitation platform 120 and/or the lending platform 130.

The file conversion engine 140 converts image files into a file format that is acceptable to lenders. For example, if a borrower takes a JPEG image of a document for submission to a lender, and the lender only accepts PDF submissions, then file conversion engine 140 may convert a JPEG file into a PDF file format once the document optimization engine 207 and the signature optimization engine 217 have optimize an image. In other embodiments, the document optimization engine 207 and signature optimization engines 217 may execute parallel to, or may optimize the converted file. The file conversion engine 140 may comprise one or more computing devices, like the computing device 10 illustrated in FIG. 5 and/or the computer system 40 illustrated in FIG. 8.

Figure 3:
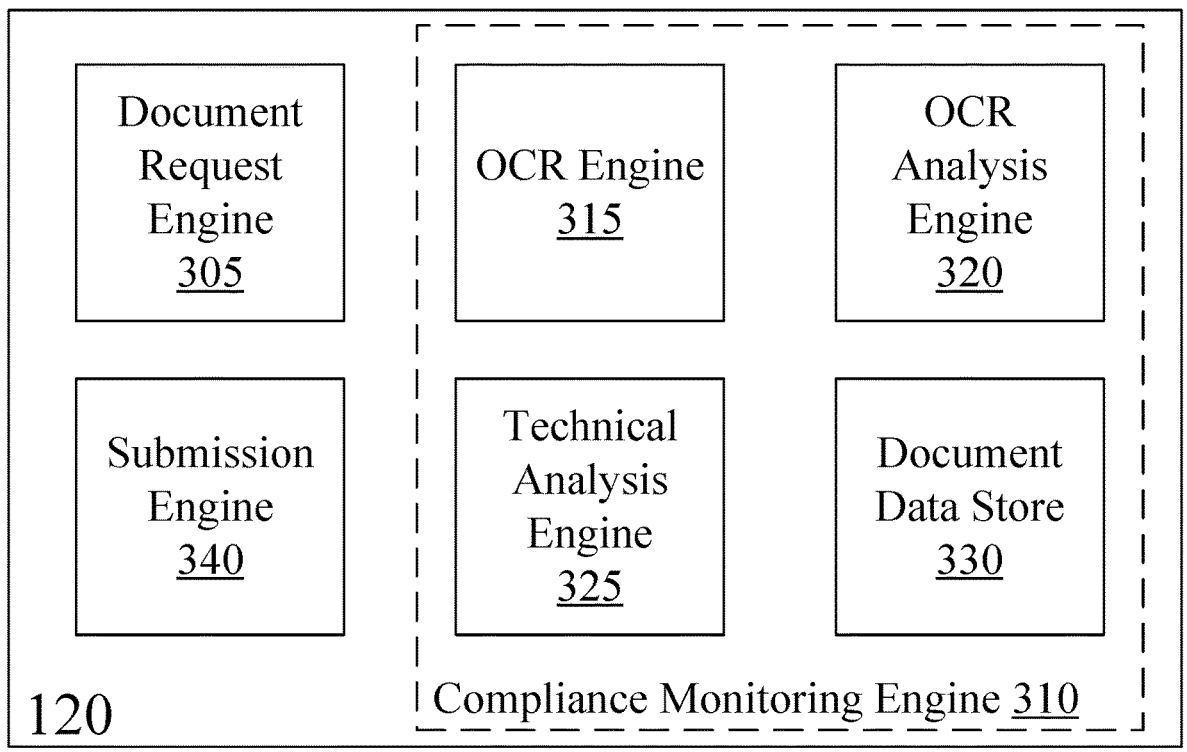
FIG. 3 is a block diagram illustrating a loan facilitation platform, according to an exemplary embodiment of the invention.

Referring now to FIG. 3, it illustrates exemplary modules executing on an exemplary loan facilitation platform 120. The platform includes a document request engine 305, a compliance monitoring engine 310, which is comprised of an OCR engine 315, OCR analysis engine 320, a technical analysis engine 325, and a document data store 330. The various modules of the loan facilitation platform 120 determine whether a document received from the mobile device 140 may be deemed acceptable by a lender, and if they are, the loan facilitation platform 120 may send the documents to the lender.

The document request engine 305 may interface with the borrower's mobile device and request the borrower to submit certain documents in support of his or her mortgage application to purchase a mobile home. In one embodiment of the invention, the document request engine 305 may also interface with the lender to identify documents that each specific lender may need for each specific type of mortgage offering the lender offers. In other embodiments, a list of documents may be constructed based on a template and/or historical understanding of needs based on similar types of loans, with similar types of terms.

The compliance monitoring engine 310 determines whether the documents provided by the user's computing device 140 will comply with the lender's guidelines and requirements. In one embodiment, the compliance monitoring engine 310 comprises an OCR engine 315, an OCR analysis engine 320, a technical analysis engine 325, and a document data store 330. The OCR engine 315 performs an optical image recognition operation on the documents received from the borrower's mobile device to identify the letters, words, and phrases that may present in the document.

The OCR analysis engine 320 analyzes the text identified by the OCR engine 315 to determine whether a document may be acceptable. In one embodiment of the invention, the OCR analysis engine 320 determines whether the identified text matches or is similar to text that would be expected from a type of document. For example, if a borrower's mobile device sends a document tagged as a driver's license, then the OCR analysis engine 320 determines whether the text identified by the OCR engine 315 matches words that are usually present in one or more state's driver license. In this manner, the OCR analysis engine ensures that the borrower's submissions are correct and not likely to be rejected by a lender. In another embodiment, the OCR analysis engine 320 identifies the number of words, phrases or letters that are identified by the ORC engine 315 and determines whether the number matches the numbers that are expected from a similar type of document. In such instances the OCR analysis engine 320 references the document data store 320 to identify text and another information that is generally present is various document types. In one embodiment, the OCR analysis engine 320 identifies the frequency and/or prevalence of misspelled words in the recognized text. If the frequency and/or prevalence of misspelled words is above a threshold, then the OCR analysis engine 320 flags a document as likely being of low quality and being unacceptable to the lender.

In one instance, the technical analysis engine 325 determines the technical quality of the document. For example, if the technical analysis engine 325 identifies four corners, and four straight lines between two or more corners, then the technical analysis engine 325 identifies the document as likely having high fidelity. In other instances, the technical analysis engine 325 provides additional processing to determine the fidelity of obtained document.

In one embodiment, the technical analysis engine 325 obtains input from a loan facilitation officer encompassing a human review. In such an embodiment, the technical analysis engine 325 prepares the document for review at a computing device that may be used by a loan facilitation officer.

Now referring to FIGS. 4a-4f illustrate the real-time or near real-time information about the status of one or more documents, and real-time or near real-time communication that is enabled by the system disclosed herein and made available to various stakeholders in the mortgage application process with respect to mobile homes. The real-time or the near real-time communication and the real-time or near real-time access to information enables the various stakeholders in the application process to timely identify errors, omissions, and technical issues that may be present in any application process, and cure the errors before the issues and/or omissions cause the application to be rejected by a lender.

FIG. 4a illustrates status indication user interface elements that may be presented to a borrower on an application executing on the borrower's mobile device 140. The user interface elements may display or more categories as they relate to the borrower's mortgage application for a mobile home. As illustrated in FIG. 4a, the categories include "To-Do Items," "Submitted" items, "Waiting on the Bank" items, and "Completed" items. The specific category label may vary without departing from the scope of the invention. However, the status indicators should identify one or more of the following: the documents that require action from the user, including a listing on number of items that a user must act on; the documents that user has successfully uploaded, including a listing of number of items submitted; a documents that are being considered by a loan facilitation system, including a listing of number of items being considered by the loan facilitation system; and a listing of items that a lender is either reviewing and/or has acted on, including a listing of number of items that a bank is considering and/or acted on, by for example, approving the document or denying it. In this manner, the system disclosed herein permits a borrower to determine exactly the items that he or she must complete, and the status of those documents.

FIG. 4b illustrates status indication user interface elements that may be displayed to a loan facilitation officer on his or her computing device. As described above with respect to FIG. 4a, FIG. 4b also illustrates user interface elements may display or more categories as they relate to the borrower's mortgage application for a mobile home. In one embodiment of the invention, the categories that are presented to a loan facilitation officer may mirror the categories that are presented to the borrower. Thus, as illustrated in FIG. 4b, the categories may include "Waiting on User," "Waiting on Bank," "Rejected," and "Completed" items. The specific category label may vary without departing from the scope of the invention. However, the status indicators should identify one or more of the following: the documents that require action from the user, including a list of documents that a borrower must provide; the documents that user has successfully uploaded, including a list of documents submitted; documents that are being considered by a loan facilitation system, including a list of items being considered by the loan facilitation system; and a listing of items that a lender is either reviewing and/or has acted on, including a list of items that a lender is considering and/or acted on, by for example, approving the document or denying it. The user interface elements may also list newly uploaded document that have been provided by the borrower, which enables the loan officer to quickly determine new action items that he or she may have to review. In this manner, the system disclosed herein permits a borrower to determine exactly the items that he or she must complete, and the status of those documents.

The system disclosed herein uniquely makes this type of information available for display to the various stakeholders. For example, as discussed above, the system disclosed herein provides an ecosystem wherein documents may be tracked, as, for example, originating from a borrower's mobile device 140, and being transmitted to a loan facilitation system 120, as being under review at the loan facilitation system 120, and as being transmitted from the loan facilitation system 120 to the lender's computing system 130. As disclosed above, the system disclosed herein is also enabled to provide information regarding the lender's review as well.

FIG. 4c illustrates a user interface elements that may be displayed to a borrower who wants to use a camera on a mobile device 140 to upload a document that has been requested by a lender. As illustrated, the user interface elements may display the document as well as an outline of what the document may look like after the document optimization engine 207 processes the image. In this manner the user interface guides the user in ensuring that high-quality images are taken.

FIG. 4d illustrates user interface elements that may be displayed to a loan facilitation officer who can approve documents provided from the borrower's mobile device. As illustrated, the user interface elements may display a preview of the document as well an user interface elements that permit the officer to accept the document, reject the document, or conditionally approve the document.

FIGS. 4e and 4f illustrates user interface elements relating to communication that is enabled by the present disclosure. Specifically, FIG. 4e illustrates user interface elements that are presented to a borrower on a mobile application running on the borrower's mobile device 140. FIG. 4d illustrates the user interface elements that are displayed to a loan facilitation officer on his or her computing device. The system disclosed herein uniquely makes this type of direct communication possible. In one embodiment, a direct communication may be opened each time an event occurs in the disclosed system. For example, if a document is uploaded, reviewed, submitted, etc., a direct line of communication may be opened between the borrower's mobile device and the loan officer's computing device. The communication may comprise a video call, a voice call, a text based message, a multi-media message, an email message, a notification, etc.

Additional Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Although the various embodiments described herein with regards to a borrower's mobile device are disclosed as being implemented in an application running on the mobile device, such implementation may be varied, for example, by displaying the information in a web browser and executing some or all of the processes at a remote location. Moreover, although the information herein is disclosed as being implemented at a loan facilitation platform 120, such processes may be implemented on a borrower's mobile device 140 or the lender platform 120. In addition, although the invention herein is described in terms of a system, the present disclosure encompasses a method for doing the same. Finally, although the invention herein is described in reference to applying for a mortgage to purchase a mobile home, the invention may be applied to other applications as well, including applications to purchase a new home, a pre-owned home, or any other items.

Referring now to FIG. 5, there is shown a block diagram depicting an exemplary computing device 10 suitable for implementing at least a portion of the features or functionalities disclosed herein, including the mobile device 140, the loan facilitation platform 120, and the lending platform 130. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAP-DRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some embodiments, systems may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

In some embodiments, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

What is claimed is:

1. A computing device comprising a non-transitory non-volatile computer-readable storage device including instructions, which, when executed by a processor of the computing device, cause the computing device to:
   receive an initiation to begin a loan application process for a mobile home purchase, the initiation comprising borrower information;
   automatically identify a list of documents that the borrower must submit to a lender to complete a mortgage application for purchasing the mobile home;
   provide a list of the automatically identified list of documents to a mobile device associated with the borrower;
   generate a status indicator for each identified document in the automatically identified list of documents, the status indicator identifying documents that a borrower must submit to the lender to complete a loan application to purchase the mobile home, documents that have been submitted by the borrower and are being reviewed by a loan facilitator, documents that have been submitted to the lender by the loan facilitator, and documents that have been reviewed by the lender;
   creating a document at the mobile device associated with the borrower by processing an image file capturing a representation of a document that the borrower must submit to the lender;
   converting, by a file conversion engine, the image file capturing a representation of a document that the borrower must submit to the lender from a file format that is not acceptable to the lender into a file format that is acceptable to the lender;
   receive the document from the mobile device associated with the borrower, the document being tagged as relating to at least one document in the list of documents that must be submitted to the lender;
   automatically determine whether the received document would be acceptable by a lender, the determination process comprising determining whether the received document complies with guidelines provided by a lender, and/or whether the document is acceptable based on optical character recognition analysis, the determination process performed before the document is sent to a lender;
   send the received document to a loan facilitation system if the converted file is determined to be acceptable to a lender;
   send a resubmission request to the borrower if the converted file is determined to not be acceptable to a lender;
   receive a determination from the loan facilitation system, the determination comprising an approval or a denial of the document sent to the loan facilitation system;
   send the received document to the lender if it is approved by the loan facilitation system;
   receive a review from the lender regarding each document sent to the lender, the review comprising an approval or a denial;
   send a resubmission request to the borrower if a denial is received from the loan facilitation system or the lender;
   automatically update the status indicator whenever a document is received from the borrower, whenever a received document is determined to be acceptable to a lender, whenever a review is received from the loan facilitation system, or whenever a review is received from the lender;
   automatically generate a notification comprising the automatically updated status indicator; and
   transmit the notification to the borrower and the loan facilitation system over the computer network in real time, so that the borrower and a loan facilitator associated with the loan facilitation system has immediate access to up-to-date loan processing information including the status of each document that is required to process a loan application.

2. The computing device of claim 1, wherein the instructions for identifying a list of documents that the borrower must submit to the lender cause the computing device to:
   send at least one question to a mobile device associated with the borrower, the question relating to biographic information;
   receive at least one answer to the at least one question from an application running on the mobile device associated with the borrower; and
   identify a list of documents based on the at least one or more received answers.

3. The computing device of claim 1, wherein the optical character recognition analysis is comprised of performing an optical character recognition analysis on the one or more documents determining whether a sufficient number of characters have been recognized, the sufficiency being determined based on an expected number of characters that are typically present in the document.

4. The computing device of claim 3, wherein the optical character recognition analysis is comprised of performing a spelling check on the recognized characters and identifying the number of misspelled words that are recognized.

5. The computing device of claim 1, wherein the image file capturing a representation of a document that the borrower must submit to the lender is converted from a JPEG format into a PDF format that is acceptable to the lender.

* * * * *